Figure 1:
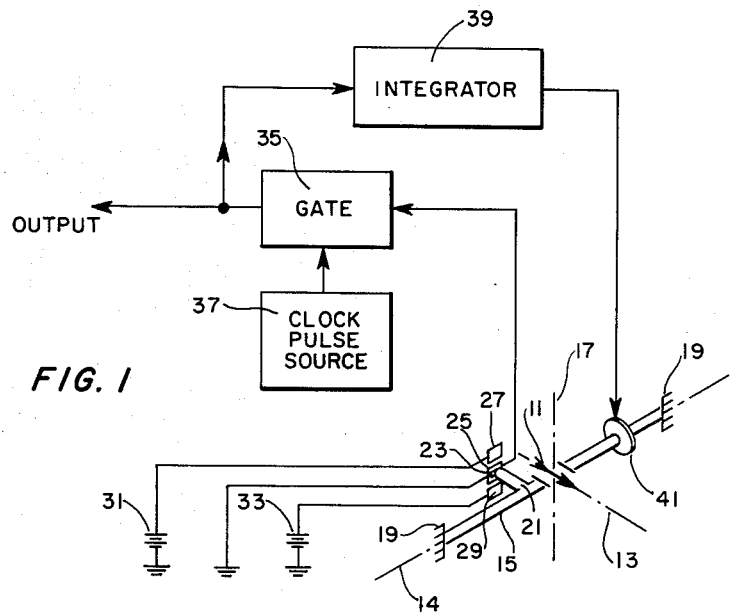

March 8, 1966    R. K. BRODERSEN    3,238,791
DIGITAL RATE GYRO
Filed Sept. 10, 1962

ROLF K. BRODERSEN
INVENTOR.

BY S. A. Giarratana
George B. Oujevolk
ATTORNEYS

United States Patent Office 3,238,791
Patented Mar. 8, 1966

3,238,791
DIGITAL RATE GYRO
Rolf K. Brodersen, Orlando, Fla., assignor to General Precision Inc., Little Falls, N.J., a corporation of Delaware
Filed Sept. 10, 1962, Ser. No. 222,558
10 Claims. (Cl. 74—5.4)

This invention relates to angular rate gyros, and more particularly to angular rate gyros which produce their outputs in digital form.

In digital navigation and guidance systems, it is necessary to have signals generated by inertial sensing instruments such as accelerometers and angular rate gyros in digital form. The output signal from a conventional angular rate gyro, which represents the rate of turning about an input axis with respect to inertial space, is an analog signal. Therefore when angular rate gyros were used in digital systems of the prior art, it was necessary to convert the analog output signals of the gyros to digital form in an analog to digital converter. The present invention provides angular rate gyros which produce their output signals in digital form, thus eliminating the need for the analog to digital converters in digital systems making use of angular rate gyros.

In accordance with the present invention, a single degree of freedom gyro is provided, which gyro is not restrained by a spring, as in a conventional angular rate gyro. When the gyro precesses through a predetermined incremental angle from a null position in one direction, it causes positive pulses to be generated and when the gyro precesses through the same incremental angle in the opposite direction from its null position, it causes negative pulses to be generated. In one embodiment of the invention, the positive and negative pulses are integrated and the signal representing the resulting integral is applied to the torquing coil of a gyro to drive the gyro back to its null position. In this embodiment, the number of negative pulses subtracted from the number of positive pulses produced by the system will represent the angular rate at which the gyro is turning about its input axis and the sign of the difference will represent the direction of turning. In another embodiment the positive and negative pulses are applied directly to the torquing coil of the gyro. In this embodiment the frequency of the pulses will represent the angular rate and the polarity of the pulses will represent the direction of turning.

Accordingly, a principal object of the present invention is to provide an accurate, reliable, angular rate gyro providing its output in digital form.

Another object of the present invention is to simplify the circuitry in digital systems making use of angular rate gyros.

A further object of this invention is to eliminate the need for analog to digital converters in digital systems making use of angular rate gyros.

Figure 2:
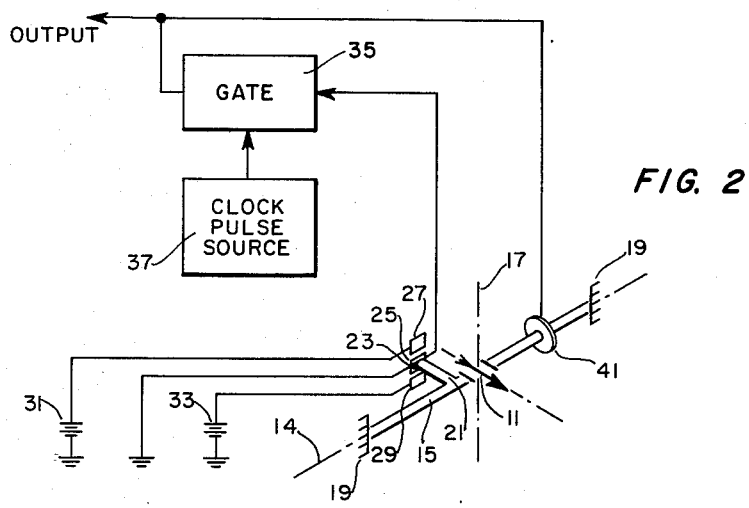

Further objects and advantages of the present invention will become readily apparent as the following detailed description of the invention unfolds and when taken in conjunction with the drawings, wherein:

FIG. 1 schematically illustrates an embodiment of the invention in which the angular rate is represented by the number of output pulses; and FIG. 2 illustrates an embodiment of the invention in which the frequency of the output pulses represents the angular rate.

In FIG. 1, the reference number 11 designates a gyro which spins about an axis 13. The gyro 11 has a single degree of freedom to precess about an axis 14 on a gimbal axle 15. A third axis 17 perpendicular to the axes 13 and 14 is the input axis of the system. The axle 15 is rotatably mounted in a frame 19 and the system measures the rate of rotation of the frame 19 about the input axis 17. When the frame 19 rotates about the axis 17, the gyro 11 will precess about the axis 14, causing the axle 15 to rotate. The axle 15 carries an arm 21 extending radially therefrom. On one end of the arm 21 is a contact brush 23.

In FIG. 1, the gyro 11 is shown in its null position. In this position the brush 23 engages a contact 25, which is grounded. A contact 27 is angularly spaced from the contact 25 about the axis 14 and is positioned to make contact with the brush 23 when the arm 21 is rotated through an incremental angle by the precession of the gyro 11 about the axis 14 in one direction. A contact 29 is angularly spaced about the axis 14 from the contact 25 on the opposite side thereof from the contact 27 and is positioned to make contact with the brush 23 when the arm 21 is rotated through an incremental angle by the precession of the gyro 11 in the opposite direction.

The contact 27 is connected to a negative constant voltage source 31 and the contact 29 is connected to a positive constant voltage source 33 equal in magnitude to the source 31. The brush 23 is connected to the input of a gate 35 which also continuously receives pulses occurring at a constant frequency from a clock pulse source 37. When the brush 23 engages the contact 27, the negative constant voltage source 31 will be applied to the gate 35 and when the brush 23 engages the contact 29, the positive constant voltage source 33 will be applied to the gate 35. When the negative voltage from the source 31 is applied to the gate 35, the gate 35 will pass this negative voltage to its output each time it receives a pulse from the clock pulse source 37. As a result, the gate 35 will produce a train of negative output pulses each having the same amplitude determined by the voltage of the source 31 and occurring at a constant frequency determined by the frequency of the clock pulse source 37. These pulses will continue to be produced at the output of the gate 35 as long as the brush 23 engages the contact 27. When the brush 23 engages the contact 29 and the positive voltage from the source 33 is applied to the gate 35, the gate 35 will pass this positive voltage to its output each time it receives a pulse from the clock pulse source 37. As a result, the gate 35 will produce a train of positive pulses at its output having a constant amplitude determined by the voltage of the source 33 and occurring at a constant frequency determined by the frequency of the clock pulse source 37.

The gate 35 will continue to produce positive pulses as long as the brush 23 engages the contact 29. The output pulses produced by the gate 35 are all applied to the input of an integrator 39. The integrator 39 integrates the pulses applied thereto and applies a D.C. signal representing the integral of these applied pulses to a torquer 41 mounted to apply a torque to the axle 15 to rotate the gyro 11 about the axis 14. The output signal of the integrator 39 will be proportional to the number of positive pulses produced by the gate 35 minus the number of negative pulses produced by the gate 35.

When the output of the integrator 39 is negative, resulting from a train of negative output pulses from the gate 35 as a result of the brush 23 engaging the contact 27, the torquer 41 in response to this negative D.C. voltage will apply a torque to the axle 15 in a direction to rotate the brush 23 out of engagement with the contact 27 towards the null position where the brush 23 engages the contact 25. When the output of the integrator 39 is positive, resulting from positive pulses produced at the output of the gate 35 as a result of the brush 23 engaging the contact 29, the torquer 41 in response to this positive voltage will apply a torque to the axle 15 in a direction to rotate the axle 15 to move the brush 23 out of engagement with the contact 29 towards the null position. With this arrangement, the number of positive pulses produced at the output of the gate 35 minus the number of negative pulses produced at the output of the gate 35 will represent the rate that the frame 19 is turning about the input axis 17 and the sign of this difference will represent the direction that the frame 19 is turning about the input axis 17. Thus the output from the gate 35 constitutes a digital representation of the rate of turning about the input axis 17.

The embodiment shown in FIG. 2 makes use of the same structure and circuitry as the embodiment shown in FIG. 1 except that the integrator 39 is eliminated and the output pulses produced by the gate 35 are applied directly to the torquer 41. Thus when the gyro 11 precesses in a direction to cause the brush 23 to engage the contact 27, the gate 35 will produce negative pulses which will be applied to the torquer 41. In response to these negative pulses, the torquer 41 will apply a torque to the axle 15 to rotate the gyro 11 back toward the null position where the brush 23 engages the contact 25. Similarly, when the gyro 11 precesses to the position where the brush 23 engages the contact 29, the gate 35 will produce positive output pulses and in response to these positive output pulses the torquer 41 will apply a torque to the axle 15 in a direction to rotate the gyro 11 back toward the null position. With this arrangement shown in FIG. 2, the frequency of the output pulses produced by the gate 35, that is the number of pulses per unit time, will represent the rate of turning of the frame 19 about the input axis 17 and the polarity of the output pulses produced by the gate 35 will represent the direction of turning.

Instead of using a brush wiping across contact segments as the pickoff for the gyro, other types of pickoffs can be used such as capacitive or photoelectric types. Alternatively, a single degree of freedom gyro with a conventional A.C. pickoff in combination with threshhold sensing circuitry may be used to provide the indication that the gyro has moved through one inceremental angle in one direction or the other from the null position. Moreover, the center contact 25 can be eliminated if some limit cycle can be tolerated. These and many other modifications may be made to the above described specific embodiments of the invention without departing from the spirit and scope of the invention which is defined in the appended claims.

In the claims:

1. A digital rate measuring instrument comprising: a single degree of freedom gyro having an output axis free of spring restraint means electrically coupled to said gyro to detect precession of said gyro about said output axis through an incremental angle from a null position and to generate a train of pulses representative of the rate and direction of precession; and means, responsive to said train of pulses electrically coupled between said last-named means and the gyro to apply a torque to said gyro in a direction to rotate said gyro about said output axis back toward said null position.

2. A digital rate measuring instrument comprising: a single degree of freedom gyro having an output axis means electrically coupled to said gyro to detect precession of said gyro about said output axis through an incremental angle from a null position and to generate a train of pulses representative of the rate and direction of precession; means electrically coupled to said pulse-generating means to integrate said train of pulses and produce an output signal representing the integral thereof; and means, electrically coupled between said integrating means and the gyro, responsive to the output signal of said integrating means to apply a torque to said gyro in a direction to cause said gyro to rotate about said output axis back toward said null position.

3. A digital rate measuring instrument comprising: a single degree of freedom gyro having an output axis free of spring restraint means electrically coupled to said gyro to detect precession of said gyro about said output axis through an incremental angle from a null position and to generate a train of pulses representative of the rate and direction of precession; a torquer connected to said gyro to rotate said gyro about said output axis in response to an applied D.C. signal; and means electrically coupled between said first-named means and said torquer to apply said pulses to said torquer.

4. A digital rate measuring instrument comprising: a single degree of freedom gyro having an output axis means electrically coupled to said gyro to detect precession of said gyro about said output axis through an incremental angle from a null position and to generate a train of pulses representative of the rate and direction of precession; a torquer connected to said gyro to rotate said gyro about said output axis; and means electrically coupled between said first-named means and said torquer to integrate said train of pulses and apply a signal representing the integral thereof to said torquer.

5. A digital rate measuring instrument comprising: a single degree of freedom gyro having an output axis free of spring restraint means electrically coupled to said gyro to detect precession of said gyro about said output axis through an incremental angle from a null position in one direction to produce a train of pulses of a first character and responsive to the precession of said gyro through said incremental angle from said null position in the opposite direction to produce a train of pulses of a second character; and means electrically coupled between said first-named means and the gyro and responsive to said trains of pulses of said first and second character to apply a torque to said gyro in a direction to rotate said gyro back toward said null position.

6. A digital rate measuring instrument comprising: a single degree of freedom gyro having an output axis free of spring restraint means electrically coupled to said gyro to detect precession of said gyro about said output axis through an incremental angle in one direction from a null position to produce a train of pulses of a first character and responsive to the precession of said gyro through said incremental angle in the opposite direction from said null position to produce a train of pulses of a second character; and means electrically coupled between said first-named means and the gyro and responsive to said train of pulses of said first character to apply a torque to said gyro in a direction to cause said gyro to rotate about said output axis in said opposite direction and responsive to said train of pulses of said second character to apply a torque to said gyro in a direction to cause said gyro to rotate about said output axis in said one direction.

7. A digital rate measuring instrument comprising: a single degree of freedom gyro having an output axis means electrically coupled to said gyro to detect precession of said gyro about said output axis through an incremental angle in one direction from a null position to produce a train of pulses of a first character and responsive to the precession of said gyro through said incremental angle in the opposite direction from said null position to produce a train of pulses of a second character; means electrically coupled between said first-named means and the gyro and to produce an output signal representing the difference between the number of pulses produced of said first character and the number of pulses produced of said second character and having a polarity representing this difference; and means electrically coupled between said last-named means and said gyro responsive to said output signal to apply a torque to said gyro in a direction depending upon the polarity of the output signal of said last-named means to cause said gyro to rotate about said precession axis in a direction back toward said null position.

8. A digital rate measuring instrument comprising:
a single degree of freedom gyro having an unrestrained output axis;
means electrically connected to said gyro to detect angular displacement thereof, from a null position, about said output axis;

means, electrically coupled to the displacement-detecting means, to generate a train of electrical pulses representative of the degree and direction of said displacement;

means selectively operable to torque said gyro about said output axis in response to applied electrical pulses; and means electrically connecting said pulse-generating means to the torquing means to operate said torquing means selectively to rotate said gyro about said output axis toward said null position.

9. A digital rate measuring instrument according to claim 8, said pulse-generating means including:

a gating circuit having an input and an output;

a source of timed pulses electrically coupled to said gating circuit to intermittently enable said gate at uniform intervals;

a first source of potential positive with respect to a reference potential;

a second source of potential negative with respect to said reference potential;

said detection means electrically coupling the first potential source to the input of said gating circuit upon displacement of said gyro from the null position in one direction about said output axis and electrically coupling the second potential source to the input of said gating circuit upon displacement of said gyro from the null position in the opposite direction about said output axis.

10. A digital rate measuring instrument according to claim 8 wherein said last-named means includes means for integrating pulses received from said pulse-generating means and for producing and supplying to said torquing means a signal representing the integral of said received pulses.

References Cited by the Examiner

UNITED STATES PATENTS 2,577,912  12/1951  Perkins et al. _____ 74—5.47 X
2,937,532   5/1960  Emmerich _____ 74—5.4

BROUGHTON G. DURHAM, *Primary Examiner.*

K. J. DOOD, *Assistant Examiner.*